United States Patent [19]
Charych et al.

[11] Patent Number: 5,825,010
[45] Date of Patent: Oct. 20, 1998

[54] BAR CODE SCANNER POSITIONING

[75] Inventors: Hal Charych, East Setauket; Stephen Osterweil, Plainview; Sundeep Kumar, East Setauket, all of N.Y.

[73] Assignee: Symbol Technologies, Inc., Holtsville, N.Y.

[21] Appl. No.: 342,738

[22] Filed: Nov. 21, 1994

[51] Int. Cl.⁶ ............................................. G06K 7/10
[52] U.S. Cl. ............................. 235/472; 235/462
[58] Field of Search .................... 235/462, 412, 235/454, 472, 470, 467, 463

[56] References Cited

U.S. PATENT DOCUMENTS

| | | | |
|---|---|---|---|
| 4,578,571 | 3/1986 | Williams | 235/472 |
| 4,730,104 | 3/1988 | Rogers | 235/412 |
| 5,140,141 | 8/1992 | Inagaki et al. | 235/462 |
| 5,374,815 | 12/1994 | Waterhouse et al. | 235/383 |
| 5,420,409 | 5/1995 | Longacre et al. | 235/462 |

*Primary Examiner*—Thien Minh Le

[57] ABSTRACT

A method of reading bar code symbols includes determining one or more parameters based upon the quantity and/or quality of the data which is being acquired, and providing the user with information concerning that parameter. The parameter may, for example, be the rate at which code words in the symbol are being read, and that information may be passed to the user by way of an LED which flashes at a rate which varies with the data acquisition rate. For a given bar code symbol being read, the rate of flashing varies with the position of the bar code reader with respect to the symbol. To improve the data acquisition rate, the user simply moves and/or rotates the bar code reader with respect to the symbol in a direction which causes the rate of flashing to increase. The invention extends to a bar code reader having means for providing an indication to a user of the relative suitability, for optimal reading of a symbol, of the current position of the reader.

21 Claims, 1 Drawing Sheet

BAR CODE SCANNER POSITIONING

BACKGROUND OF THE INVENTION

1. Field of the Invention

The present invention relates generally to bar code scanning systems, and in particular to a method and apparatus for optimizing or at least improving the relative positions of bar code scanner and symbol to be read, during data acquisition.

2. Description of the Prior Art

A frequently encountered problem with bar code scanning, is the difficulty of aligning the scanner in a manner which allows optimal code word (data character) acquisition from the symbol. This may be especially true of two-dimensional bar code symbols having a very low height to width ratio. The best acquisition occurs when the scan line is parallel to the symbol, and crosses none of the rows of the symbol. In certain currently-available bar code scanners, acquisition can still be carried out at up to several degrees of parallel, but at a processing, and consequently at a speed, cost. If the scan line is too skew with respect to the symbol, then the symbol cannot be decoded at all. Decoding may also be difficult if the symbol is slightly skew with respect to the scan line, and is also a relatively long way away from the scanner.

Previous methods of improving the readability of bar code symbols have concentrated upon maintaining the printed quality of the symbol itself, and ensuring that the printed symbol can easily be read under optimal conditions. To that end, there have been several proposals for devices which check printed symbol quality, such as the relative width of the bars and spaces, to provide a warning to the printer if the bar code quality degenerates to such an extent that difficulties are likely to be experienced when the symbols ultimately come to be read (for example in a supermarket environment). One such method for checking the quality of printed bar code symbols is disclosed in U.S. Pat. No. 4,251,798, commonly assigned with the present application. Further details of a bar code verification device which was sold by the present assignee under the brand name "Laserchek®" may be found in the article by J. Swartz of 1 May 1980, entitled "Percent Decode, POS Scanability, and the Laserchek Symbol Analyzer" published by Symbol Technologies, Inc.

The intention of all of these prior art systems was to reduce the number of misreads by end users (for example, supermarket checkout staff) to as low a value as possible by maintaining rigorous quality control on the printed symbol itself. Clearly, the higher the quality of the printed symbol, the more leeway there will be for a checkout operator to miss a line or otherwise mis-align or otherwise poorly position the bar code reader with respect to the symbol being read without a misread resulting.

SUMMARY OF THE INVENTION

Objects of the Invention

The present invention aims to reduce the number of bar code symbols which result in a misread by helping the user of the scanner properly align and position the scanner over the symbol.

It is accordingly an object of the present invention to assist a user of the scanner properly to align and position the scanner over the symbol, to maximize the rate of code word acquisition and thereby shorten decode time.

It is a further object of the invention to provide an indication to the user when the bar code scanner is in a position in which specular reflections are interfering with the data acquisition process.

Features of the Invention

In keeping with these objects, and others which will become apparent hereafter, there is provided according to one aspect of the invention a bar code reader for reading bar code symbols, each symbol including a plurality of data characters, the reader having a scanning head including means for generating a scanning light beam to be directed toward a symbol to be read, on a target; detection means for receiving reflected light from the symbol to produce electrical signals corresponding to data represented by the symbol; and positioning information means responsive to the electrical signals and arranged in use to provide an indication to a user of the relative suitability for optimal reading of the symbol of the current position of the reader with respect to the target.

Preferably, the positioning information means may comprise a light means, for example, an LED. The light means may be arranged to flash at a rate which indicates to the user the relative suitability of the current position.

Alternatively, the positioning information means may comprise a sound source, for example, a variable pitch sound source in which the pitch of the sound indicates to the user the suitability of the current position. In another embodiment, the sound source could be arranged to produced a repeated tone at a variable repetition rate, with the repetition rate indicating to the user the relative suitability of the current position.

The indication which is provided to the user may be based upon any one or more of a number of calculated criteria relating to the quality and/or to the quantity of the data which is being acquired by the bar code reader. For example, the indication could be based upon the rate at which data characters are being read, or alternatively to the rate at which start and stop code words on the symbol are being detected. It could also be based upon the calculated distance between start and/or stop code words, as read from the symbol, and the end of the scan line; this is useful for indicating if the scan line extends too far over the ends of the symbol. The indication could, further, be based upon a calculated distance between the scanning head and the target, or the number of rows of data characters in the symbol which are being crossed by a single scan line (the number of "cluster crossings").

The indication could be based upon any chosen combination of the above features, or indeed any other values representative of the quality of quantity of the data which is being acquired.

Since the information is being provided to the user in real time, that is, as data acquisition proceeds, it is a simple matter for the user to move the bar code scanner, or to move the target on which the symbol is printed, to improve the positioning and/or orientation.

According to a further aspect of the present invention, there is provided a method of reading a bar code symbol, each symbol including a plurality of data characters, using a bar code reading having a scanning head including means for generating a scanning light beam, and detection means for receiving reflected light from a symbol being read and for producing electrical signals corresponding to data represented by the symbol, the method comprising:

(a) relatively positioning the reader and a target carrying a symbol to be read, with the scanning light beam arranged to scan across the symbol;

(b) determining, from the electrical signals, the relative suitability for optimal reading of the symbol the current relative position of the reader and the target;

(c) producing a suitability signal representative of the relative suitability; and (d) adjusting the current relative position in dependence upon the suitability signal.

The suitability signal may indicate to the user when the relative positioning of the bar code scanner and the target is sub-optimal, for example, because the symbol is skew with respect to the scan lines, because the symbol is too far away from the scanner, or because the center of the scanned area is not substantially coincident with the center of the symbol.

The information provided by the suitability signal may provide the user with an indication that the scanner is in the "dead zone" where specular reflections from the bar code symbol are swamping the defuse reflections which provide the data to be read. The user may then move the bar code scanner, or the bar code symbol, to a different position and/or angle to avoid the specular reflections.

The invention may be carried into practice in a number of ways, and one specific embodiment will now be described, by way of example, with reference to the accompanying drawings.

DESCRIPTION OF THE PREFERRED EMBODIMENT

Figure 1:
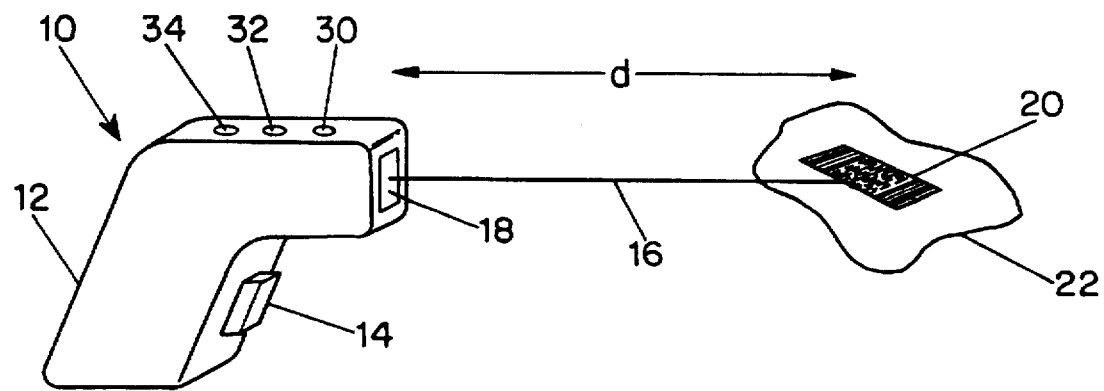
FIG. 1 shows an exemplary bar code scanner embodying the present invention.
Figure 2:
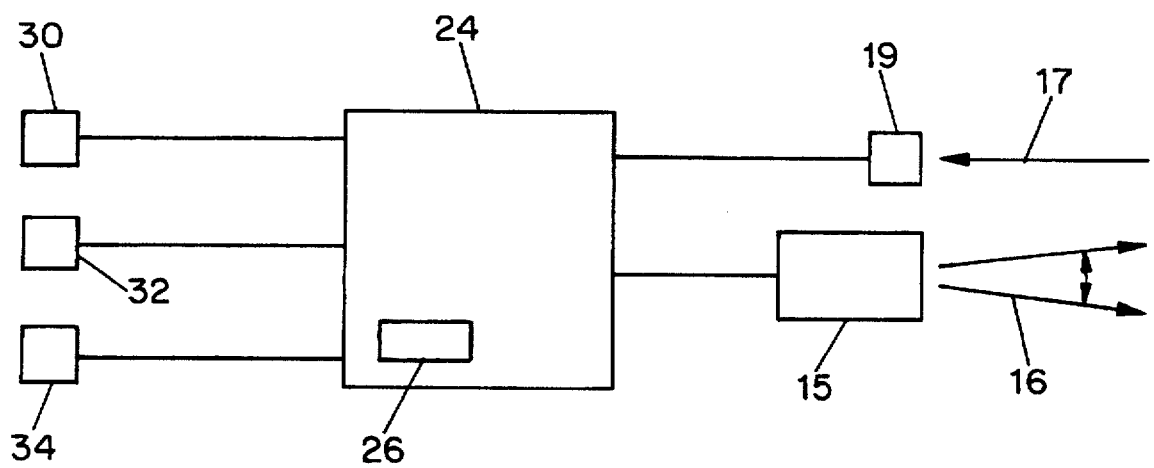
FIG. 2 is a block diagram illustrating the operation of the bar code scanner of FIG. 1.

A hand-held scanner 10 embodying the present invention is shown schematically in FIG. 1. The scanner has a manually-graspable handle portion 12, carrying a trigger 14, which the user presses to actuate the scanner. Upon actuation, a scanning head 15 (FIG. 2) produces a scanning light beam 16, which leaves the scanner via a window 18. The user directs the scanning light beam 16 so that it falls on a target 22 carrying a bar code symbol 20 to be decoded. Light 17 reflected back from the bar code symbol 20 passes through the window 18 and is detected by a photosensor 19. Signals from the photosensor 19 are passed to a processor unit 24 including a microprocessor 26.

The processor unit 24 provides a real-time analysis of code word acquisition from the symbol 20, and determines a number of parameters based upon the quality and the quantity of the data that is being acquired. These parameters are calculated under control of computer software in the microprocessor 26, such software being well within the ordinary skill of one skilled in this field.

Parameters may be calculated based upon any one of many values, such as, for example, the number of scan lines with proper margin indicators, the number of cluster crossings (that is, the number of rows in a two-dimensional bar code symbol which are crossed in a single scan line), the code word count, the resynchronization count, the start and stop code word count, the distance between start and stop code words from the ends of the scan line (this indicates if the scan line extends too far over the ends of the symbol), the error count reduction rate, the code word (data) acquisition rate, and the relative calculated distance from the bar code reader to the symbol.

In PDF 417 decoding, if a particular scan lines does not contain two row ID's (which encode the row numbers), then the scan line may only cross part of the symbol. If this happens frequently, it is a clear indicator that the scanner and symbol are improperly aligned.

In an implementation of a PDF 417 decoder, the software must attempt to find valid codewords in the scan line beginning at the point where the scan line has crossed horizontal rows. Crossing rows usually results in an invalid codeword at the point of crossing. We term the process of finding valid codewords after a row crossing "resynchronization". Thus, the resynchronization count can be used as a measure of the frequency of row crossings and thus as a measure of how well aligned the scanner and symbol are.

In PDF 417, as codewords are acquired and confirmed to be valid, they are added to the matrix (or image) of the decoded symbol. The number of codewords present in the symbol is known, since that is encoded within the symbol itself. The number of codewords missing from the final image is known as the error count. The rate at which the error count reduces may be an even better measure that codeword acquisition rate, since it can reveal not only that the scanner and symbol may be well aligned, but well aligned to acquire the necessary remaining codewords. Acquiring codewords that have already been acquired and confirmed to be correct is not useful.

Signals representative of one or more of the above parameters are then passed to positioning information means comprising a light-emitting diode (LED) 30 and a small loudspeaker 32. These provide feedback to the user comprising an indication of how well data acquisition is currently proceeding, based upon the present position and/or orientation of the bar code reader 10 relative to the bar code symbol 20. Clearly, if the distance d between the two is too great, then data acquisition is likely to proceed more slowly than it should, and in extreme cases will cease altogether. Similarly, if the scan lines produced by the scanning beam 16 are not aligned exactly with the rows of characters in the two-dimensional bar code symbol 20, then acquisition will be further compromised. Because of the connection between sub-optimal positioning and/or alignment of the scanner with respect to the symbol, and the quality and quantity of data acquisition, the signals produced by the LED 30 and the loudspeaker 32 can provide the user with an indication of the extent to which the current positioning is sub-optimal.

In one embodiment, the LED 30 flashes at a variable rate, the rate being greater when the positioning is optimal than when it is sub-optimal. In use, the user simply moves the scanner 10 to a location in which the LED is flashing rapidly. To do this, he may need to alter the distance d, to adjust the positional alignment of the scanning beam 16 with respect to the symbol, or to adjust the relative angular alignment. Alternatively, if the scanner 10 is fixed in position (for example, if it is held in a stand (not shown), the user simply adjusts the position of the target to try to increase the flashing rate of the LED 30.

The loudspeaker 32 provides a variable pitch sound source, the pitch increasing as the positioning becomes closer to the optimal position. Alternatively, in another embodiment, the loudspeaker may provide a repeated pulse of sound, the frequency of the pulse being dependent upon the suitability of the positioning.

The LED 30 and the loudspeaker 32 need not both be provided: in alternative embodiments (not shown) one or the other may be omitted.

A further LED is provided which simply indicates whether the scanner is on or off.

We claim:

1. A bar code reader for reading bar code symbols, each symbol including a plurality of encoded data characters, the reader having:

a scan head including a light beam generator for generating a scanning light beam to be directed toward a symbol to be read;

a light detector for receiving reflected light from the symbol to produce electrical signals corresponding to data represented by the symbol; and a dynamically varying relative position information indicator responsive to the electrical signals and arranged in use to dynamically provide a varying indication to a user during decoding of the relative suitability of a current position of the reader with respect to the symbol for optimal reading of the symbol.

2. A bar code reader as claimed in claim 1 in which the relative position information indicator comprises a light source.

3. A bar code reader as claimed in claim 2 in which the light source has a variable flash rate and is arranged to flash at a rate which indicates to the user the relative suitability of said current position.

4. A bar code reader as claimed in claim 1 in which the light beam generator is a light-emitting diode.

5. A bar code reader as claimed in claim 1 in which the relative position information indicator is a sound source.

6. A bar code reader as claimed in claim 5 in which the sound source is a variable pitch sound source, the pitch of the sound indicating to the user the relative suitability of the said current position.

7. A bar code reader as claimed in claim 5 in which the sound source is arranged to produce a repeated tone at a variable repetition rate, the repetition rate indicating to the user the relative suitability of the said current position.

8. A bar code reader as claimed in claim 1 in which the relative position information indicator is arranged to provide the indication to the user based on the rate at which data characters are being read.

9. A bar code reader as claimed in claim 1 in which the relative position information indicator is arranged to provide the indication to the user based on the rate at which the start and stop code words on the symbol are being detected.

10. A bar code reader as claimed in claim 1 in which the relative position information indicator is arranged to provide the indication to the user based on a calculated distance between the start or stop code words, as read from the symbol, and an end of a scan line that the scanning light beam traces over the symbol.

11. A bar code reader as claimed in claim 1 in which the relative position information indicator is arranged to provide the indication to the user based on a calculated distance between the scanning head and the target.

12. A bar code reader as claimed in claim 1 in which the relative position information indicator is arranged to provide the indication to the user based on the number of rows of data characters in the symbol which are being crossed by a single scan line that the scanning light beam traces over the symbol.

13. A bar code reader as claimed in claim 1 comprising a portable hand-held reader.

14. A method of reading a bar code symbol, each symbol including a plurality of encoded data characters, using a bar code reader having a scanning head including a scanning light beam generator, and a light detector for receiving light from a symbol being read and for producing electrical signals corresponding to data represented by the symbol, the method comprising:

(a) positioning the reader relative to an item carrying a symbol to be read, with the scanning light beam arranged to scan across the symbol;

(b) determining, from the electrical signals, the relative suitability of a current position of the reader with respect to the symbol for optimal reading of the symbol;

(c) producing via a dynamically varying relative position information indicator a dynamically varying relative suitability signal representative of the relative suitability of the current position; and (d) adjusting the current relative position in dependence upon the dynamically varying relative suitability signal.

15. A method as claimed in claim 14 in which the adjusting step includes moving the symbol with respect to the reader.

16. A method as claimed in claim 14 in which the adjusting step includes moving the reader with respect to the symbol.

17. A method as claimed in claim 14 in which the determining step comprises calculating from the electrical signals a value representative of the distance between the scanning head and the symbol, and in which the relative suitability signal is representative of the said value.

18. A method as claimed in claim 14 in which the determining step comprises calculating from the electrical signals a value representative of the angular alignment of the scanning light beam with the symbol, and in which the suitability signal is representative of the said value.

19. A bar code reader for reading bar code symbols, each symbol having a number of encoded data characters, the reader including:

a scan head including a light beam generator for generating an automatically scanning light beam to be directed toward a symbol to be read;

a light detector for receiving reflected light from the symbol to produce electrical signals corresponding to data represented by the symbol; and a dynamically varying relative position information indicator for providing a dynamically varying indication to a user during decoding of the symbol of the relative suitability of a current position of the bar code reader with respect to the symbol for optimal reading of the symbol.

20. The bar code reader of claim 19, wherein the position indicator is an audible indicator.

21. The bar code reader of claim 20, wherein the position indicator is a visual indicator.

* * * * *